United States Patent
Feng et al.

(10) Patent No.: US 10,917,249 B2
(45) Date of Patent: *Feb. 9, 2021

(54) PROCESSING DATA ELEMENTS STORED IN BLOCKCHAIN NETWORKS

(71) Applicant: Advanced New Technologies Co., Ltd., Grand Cayman (KY)

(72) Inventors: Zhiyuan Feng, Hangzhou (CN); Yanpeng Li, Hangzhou (CN); Long Cheng, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/945,296

(22) Filed: Jul. 31, 2020

(65) Prior Publication Data

US 2020/0366505 A1 Nov. 19, 2020

Related U.S. Application Data

(63) Continuation of application No. 16/713,428, filed on Dec. 13, 2019, now Pat. No. 10,778,445, which is a
(Continued)

(51) Int. Cl.
*H04L 29/06* (2006.01)
*H04L 9/32* (2006.01)
(Continued)

(52) U.S. Cl.
CPC ........ *H04L 9/3265* (2013.01); *G06F 16/2379* (2019.01); *H04L 9/0637* (2013.01);
(Continued)

(58) Field of Classification Search
CPC .......................... H04L 9/3265; H04L 63/0876
See application file for complete search history.

(56) References Cited

U.S. PATENT DOCUMENTS 10,382,205 B1 8/2019 Ko
10,778,445 B1 * 9/2020 Feng ................... H04L 9/0637
(Continued)

FOREIGN PATENT DOCUMENTS

CN 105162652 12/2015
CN 105430195 3/2016
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Victor Lesniewski
(74) *Attorney, Agent, or Firm* — Fish & Richardson P.C.

(57) ABSTRACT

Disclosed herein are methods, systems, and apparatus, including computer programs encoded on computer storage media, for managing data element stored in a blockchain network. One of the methods includes receiving a request from a client computing device to store a data element into the blockchain network by a blockchain data element processing server. The blockchain data element processing server determines whether the client computing device is authorized to store the data element into the blockchain network and whether the data element is a sensitive data element. If the client computing device is authorized to store the data element into the blockchain network and the data element is not a sensitive data element, the blockchain data element processing server stores the data element that is encrypted using an encryption algorithm into the blockchain network.

27 Claims, 6 Drawing Sheets

Related U.S. Application Data continuation of application No. PCT/CN2019/087053, filed on May 15, 2019.

(51) Int. Cl.
  *G06F 16/23* (2019.01)
  *H04L 9/06* (2006.01)

(52) U.S. Cl.
  CPC ........ *H04L 9/3247* (2013.01); *H04L 63/0876* (2013.01); *H04L 63/10* (2013.01); *H04L 2209/38* (2013.01)

(56) References Cited

U.S. PATENT DOCUMENTS

| | | |
|---|---|---|
| 2016/0342978 A1 | 11/2016 | Davis et al. |
| 2017/0180134 A1 | 6/2017 | King |
| 2017/0279818 A1 | 9/2017 | Milazzo et al. |
| 2018/0167200 A1 | 6/2018 | High et al. |
| 2018/0308161 A1 | 10/2018 | Sekimura et al. |
| 2019/0130394 A1 | 5/2019 | Stollman et al. |
| 2019/0205563 A1 | 7/2019 | Gonzales, Jr. |
| 2019/0207755 A1 | 7/2019 | Gu et al. |
| 2019/0228132 A1 | 7/2019 | Gabriel et al. |
| 2019/0266146 A1 | 8/2019 | Rose et al. |
| 2019/0273739 A1 | 9/2019 | Pemmaraju |
| 2019/0281066 A1 | 9/2019 | Simons |
| 2019/0334886 A1 | 10/2019 | Lelcuk et al. |
| 2019/0347660 A1 | 11/2019 | Wilkinson et al. |
| 2019/0372956 A1 | 12/2019 | Breu |
| 2019/0379531 A1 | 12/2019 | Aleksander et al. |
| 2019/0379699 A1 | 12/2019 | Katragadda et al. |
| 2020/0204345 A1* | 6/2020 | Chee .................. H04L 63/0478 |
| 2020/0244634 A1* | 7/2020 | Benavides .......... H04L 63/0876 |
| 2020/0257778 A1* | 8/2020 | Pham .................... G06F 21/45 |

FOREIGN PATENT DOCUMENTS

| | | |
|---|---|---|
| CN | 109344647 | 2/2019 |
| CN | 109600366 | 4/2019 |
| WO | WO 2019032089 | 2/2019 |

OTHER PUBLICATIONS

Extended European Search Report in European Application No. 19741033.5, dated Apr. 20, 2020, 8 pages.

Nakamoto, "Bitcoin: A Peer-to-Peer Electronic Cash System," www.bitcoin.org, 2005, 9 pages.

PCT International Search Report and Written Opinion in International Application No. PCT/CN2019/087053, dated Feb. 10, 2020, 8 pages.

Wang et al., "A Blockchain-Based Framework for Data Sharing With Fine-Grained Access Control in Decentralized Storage Systems," IEEE Access, Jun. 2018, 6:38437-38450.

Liang et al. "Integrating Blockchain for Data Sharing and Collaboration in Mobile Healthcare Applications," 28th Annual International Symposium on Personal, Indoor, and Mobile Radio Communications (PIMRC), Oct. 2017, 5 pages.

* cited by examiner

PROCESSING DATA ELEMENTS STORED IN BLOCKCHAIN NETWORKS

CROSS-REFERENCE TO RELATED APPLICATIONS

This application is a continuation of U.S. application Ser. No. 16/713,428, filed on Dec. 13, 2019, now U.S. Pat. No. 10,778.445, which is a continuation of PCT Application No. PCT/CN2019/087053, filed on May 15, 2019, which is hereby incorporated by reference in its entirety.

TECHNICAL FIELD

This specification relates to processing data elements stored in blockchain networks.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular user case. Examples of types of blockchain networks can include public blockchain networks, private blockchain networks, and consortium blockchain networks. A consortium blockchain network is provided for a select group of entities, which control the consensus process, and includes an access control layer.

A blockchain network can be used for storing data from an external entity. In some instances, the data from the external entity can include sensitive data, such as personally identifiable information (e.g., biometric data, medical information, or Social Security numbers), that can be traced back to an individual, and that, if disclosed, could result in harm or loss to that person. Due to the transparent nature of blockchain networks, sensitive data stored in the blockchain networks can be easily obtained by a malicious actor, thereby causing data leakage issues. In some instances, an external entity can access the data stored in the blockchain network without authorization, thereby compromising the data security of the blockchain network.

Thus, it would be desirable to provide a solution to addressing the data leakage and security issues in the blockchain network.

SUMMARY

This specification describes technologies for processing data elements stored in a blockchain network. These technologies generally involve managing and censoring data elements that are stored in and/or retrieved from a blockchain network such that data elements that are not sensitive data elements can be stored in and/or retrieved from the blockchain network. The sensitive data element can include data under surveillance or censorship (e.g., privacy information or a malicious program that poses a potential security threat) by an authorization entity.

When a client computing device submits a request to store a data element in or retrieve a data element from a blockchain network, an identity of the client computing device needs to be authenticated by a blockchain data element processing server. An authenticated client computing device can be permitted to store data in or retrieve data from the blockchain network, while a client computing device that fails authentication will be prohibited from storing the data in the blockchain network.

Furthermore, the blockchain data element processing server can determine whether the data element to be stored in the blockchain network is a sensitive data element. Data elements that are determined to not be sensitive can be permitted to be stored in the blockchain network, while data elements that are determined to be sensitive can be prohibited. The blockchain network verifies a digital signature that is sent along with the data element from the blockchain data element processing server, and stores the data element if the digital signature is valid. The data elements that are stored in the blockchain network are encrypted using an encryption algorithm.

This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
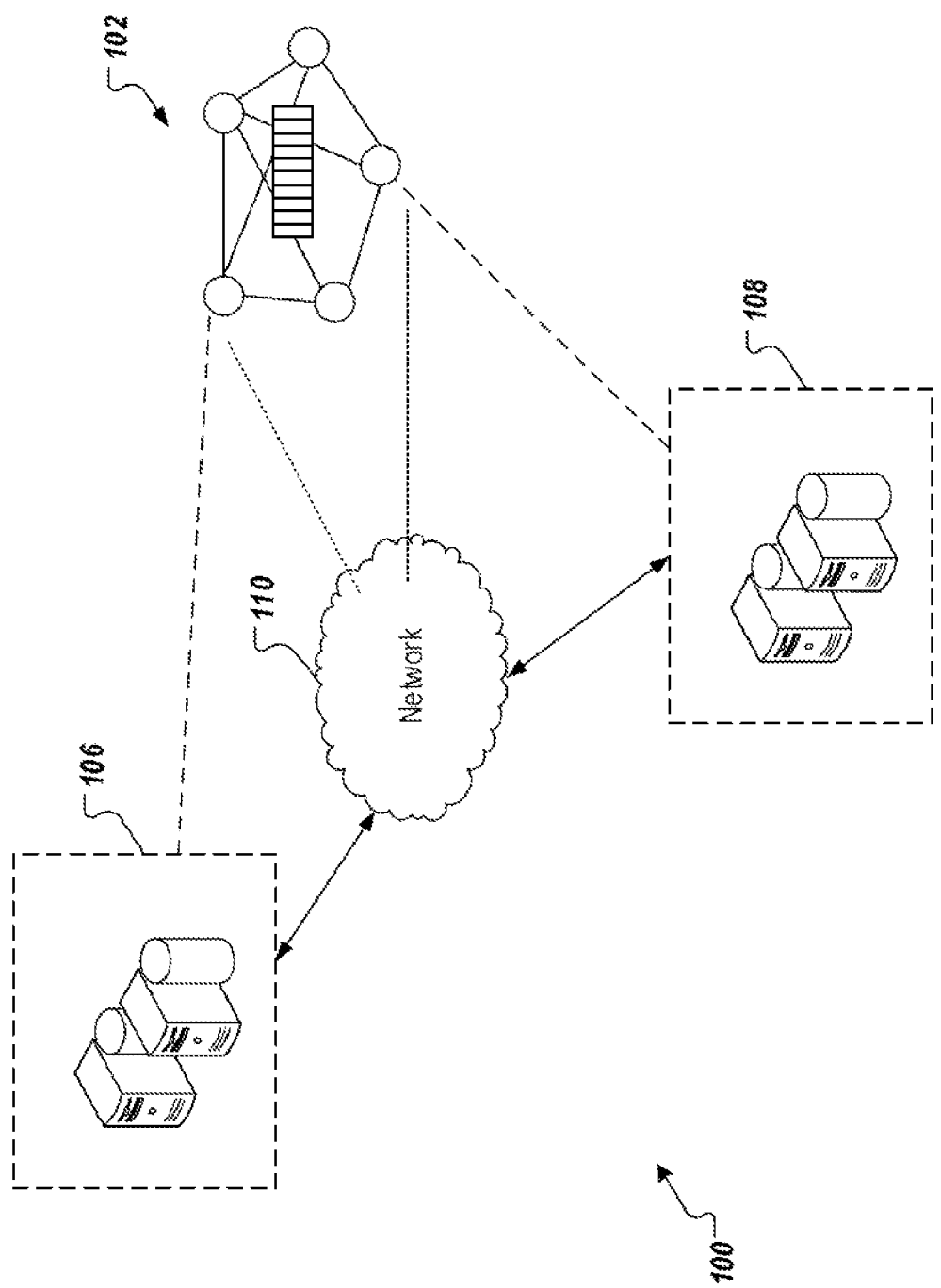
FIG. 1 is a diagram illustrating an example of an environment that can be used to execute embodiments of this specification.

This specification describes technologies for processing data elements stored in a blockchain network. These technologies generally involve managing and censoring data elements that are stored to and/or retrieved from a blockchain network such that data elements that are not sensitive data elements can be stored to and/or retrieved from the blockchain network. The sensitive data element can include data that are under surveillance or censorship (e.g., privacy information or a malicious program that poses potential security threat) by an authorization entity.

When a client computing device submits a request to store a data element into or retrieve a data element from a blockchain network, an identity of the client computing device needs to be authenticated by a blockchain data element processing server. An authenticated client computing device can be allowed to store data into or retrieve data from the blockchain network, while a client computing device that fails the authentication will not be allowed to store the data into the blockchain network.

Furthermore, the blockchain data element processing server determines whether the data element to be stored into the blockchain network is a sensitive data element. Data elements that are not determined as a sensitive data element can be allowed to store into the blockchain network, while data elements that are determined as a sensitive data element will be declined. The blockchain network verifies a digital signature that is sent along with the data element from the blockchain data element processing server, and stores the data element if the digital signature is valid. The data elements that are stored in the blockchain network are encrypted using an encryption algorithm.

The techniques described in this specification can produce one or more technical effects. For example, the methods described herein can provide improved control of data elements that are to be stored in a blockchain network. In some embodiments, when a client computing device submits a request to store data in or retrieve data from a blockchain network, an identity of the client computing device needs to be authenticated. In some embodiments, an authenticated client computing device can be allowed to store data into or retrieve data from the blockchain network, while a client computing device that fails the authentication will not be allowed to access the data in the blockchain network. This can prevent the data stored in the blockchain network from being compromised by malicious actors, thereby improving the data security of the blockchain network. Furthermore, in some embodiments, it is determined whether a data element to be stored into the blockchain network is a sensitive data element (e.g., privacy information or a malicious program that poses potential security threat). In some embodiments, data elements that are not determined as a sensitive data element can be allowed to store into the blockchain network, while data elements that are determined as a sensitive data element will be declined. This can further improve date security of the blockchain network. In some embodiments, the blockchain network verifies a digital signature that is received with the data element, and stores the data element if the digital signature is valid. This facilitates verifying that the data element is sent by a trusted entity and that the data element is not altered during transmission, thereby improving data security. In some embodiments, the data elements stored in the blockchain network are encrypted using an encryption algorithm. This prevents the data elements from being easily obtained by a malicious actor who is not authorized to obtain the data elements. In some embodiments, a client computing device that obtains a data element from the blockchain network can verify integrity of the data element based on a hash value of the data element, thereby mitigating negative effects resulting from malicious alternation of the data element.

To provide further context for embodiments of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. It is contemplated, however, that embodiments of this specification can be realized in any appropriate type of blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

FIG. 1 is a diagram illustrating an example of an environment 100 that can be used to execute embodiments of this specification. In some examples, the environment 100 enables entities to participate in a consortium blockchain network 102. The environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general the network 110 represents one or more communication networks. In some cases, the computing devices 106, 108 can be nodes of a cloud computing system (not shown), or each computing device 106, 108 can be a separate cloud computing system including a number of computers interconnected by a network and functioning as a distributed processing system.

In the depicted example, the computing devices 106, 108 can each include any appropriate computing system that enables participation as a node in the consortium blockchain network 102. Examples of computing devices include, without limitation, a server, a desktop computer, a laptop computer, a tablet computing device, and a smartphone. In some examples, the computing devices 106, 108 host one or more computer-implemented services for interacting with the consortium blockchain network 102. For example, the computing device 106 can host computer-implemented services of a first entity (e.g., user A), such as a transaction management system that the first entity uses to manage its transactions with one or more other entities (e.g., other users). The computing device 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing devices 106, 108 provide nodes of the first entity, and second entity respectively, which participate in the consortium blockchain network 102.

Figure 2:
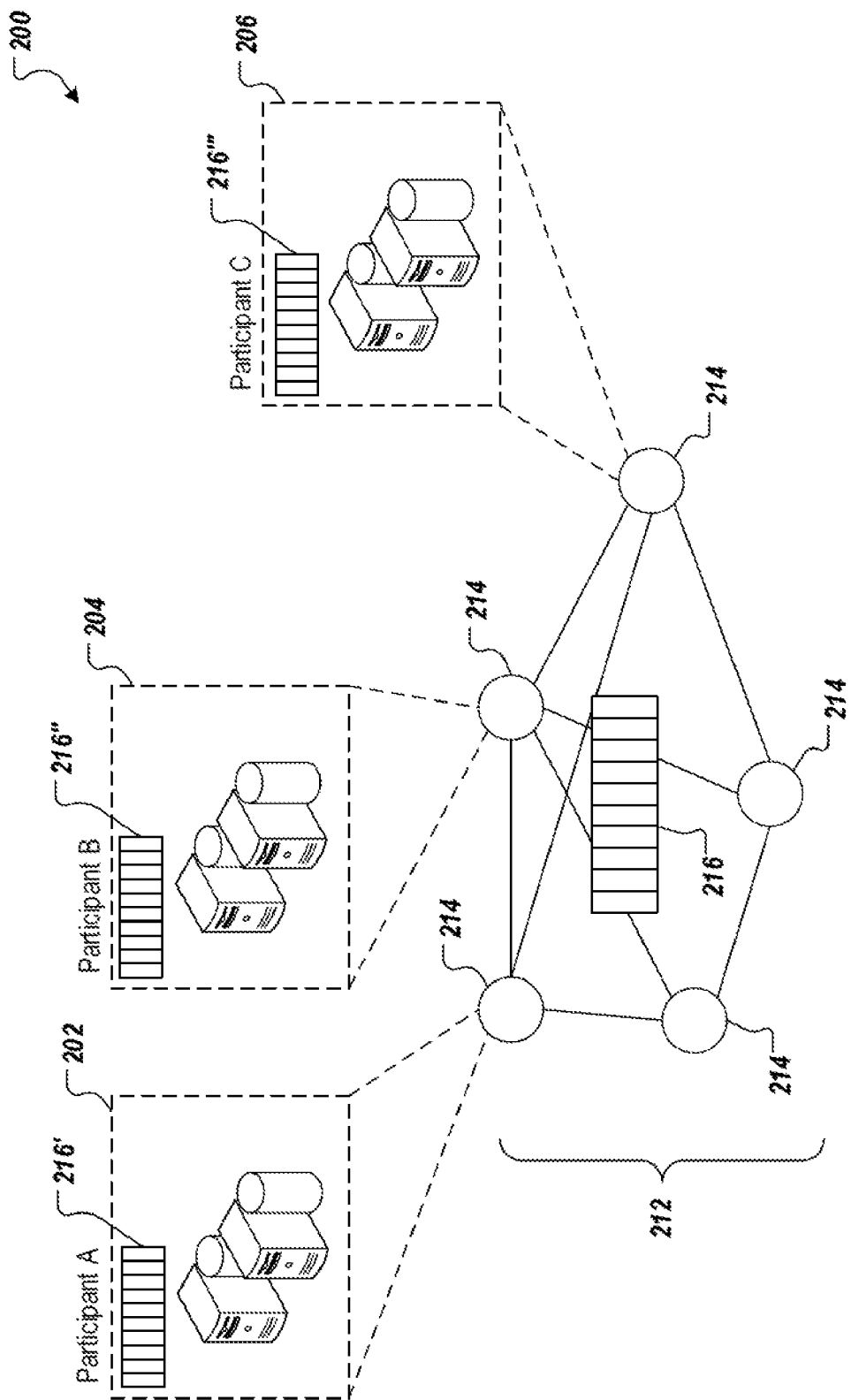
FIG. 2 is a diagram illustrating an example of an architecture in accordance with embodiments of this specification.

FIG. 2 depicts an example of an architecture 200 in accordance with embodiments of this specification. The conceptual architecture 200 includes participant systems 202, 204, 206 that correspond to Participant A, Participant B, and Participant C, respectively. Each participant (e.g., user, enterprise) participates in a blockchain network 212 provided as a peer-to-peer network including a plurality of nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as miner nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204 store respective, complete copies 216', 216" of the blockchain 216.

A blockchain (e.g., the blockchain 216 of FIG. 2) is made up of a chain of blocks, each block storing data. Examples of data include transaction data representative of a transaction between two or more participants. While transactions are used herein by way of non-limiting example, it is contemplated that any appropriate data can be stored in a blockchain (e.g., documents, images, videos, audio). Examples of a transaction can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed, Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

Figure 3:
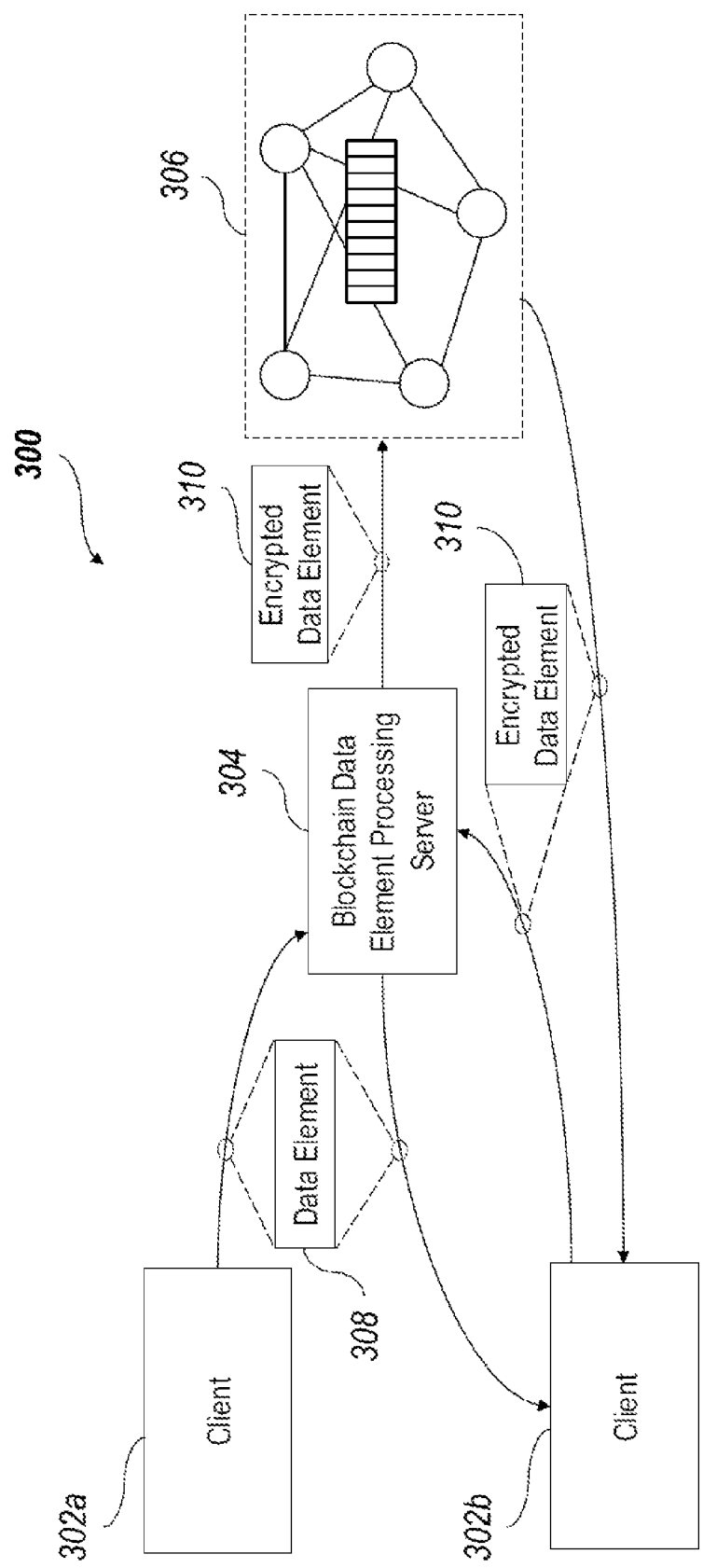
FIG. 3 is a diagram illustrating an example of a system in accordance with embodiments of this specification.

FIG. 3 is a diagram illustrating an example of a system 300 that processes data elements stored in blockchain networks. As shown, system 300 includes multiple client computing devices 302a-b, a block chain data element processing server 304, and a blockchain network 306. Client computing device 302 and blockchain data element processing server 304 can be any suitable computer, module, server, or computing element programmed to perform the methods described herein. In general, system 300 provides a solution to managing and censoring data that is stored to and/or retrieved from a blockchain network such that data elements that are not sensitive data elements can be stored to and/or retrieved from the blockchain network.

In some embodiments, the sensitive data can include data under surveillance or censorship by an authorization entity. For example, the sensitive data can include personal information such as personally identifiable information (e.g., biometric data, medical information, or Social Security numbers) that can be traced back to an individual, and that, if disclosed, could result in harm or loss to that person. The sensitive data can include sensitive business information (e.g., trade secrets, acquisition plans, or financial data) that poses a risk to a business entity if discovered by a competitor or the general public. The sensitive data can include classified information pertaining to a government body and restricted according to a level of sensitivity (for example, restricted, confidential, secret, and top secret) in order to protect information security. In some embodiments, the sensitive data can have a formatted as text, audio, video, or images.

Generally in operation, a client (e.g., client computing device 302a) sends a request to the blockchain data element processing server 304 to store a data element 308 into the blockchain network 306. The blockchain data element processing server 304 receives the request to store the data element 308 and determines whether the data element 308 is a sensitive data element. In some embodiments, the blockchain data element processing server 304 can include a sensitive data identifying subsystem that determines whether a data element 308 is a sensitive data element. For example, the sensitive data identifying subsystem can include a black library that stores a list of sensitive data elements periodically updated by an authorization entity. In some embodiments, the black library is a data library or data repository that stores a collection of the sensitive data elements and provides access to the sensitive data elements through various means or user interfaces. Note that in some embodiments, the sensitive data identifying subsystem can be a standalone system that is externally-located with respect to the blockchain data element processing server 304.

If a determination is made that the data element 308 in the request is a sensitive data element, the blockchain data element processing server 304 can reject the request and send a warning message to the client 302a. If a determination is made that the data element 308 is not a sensitive data element, the blockchain data element processing server 304 can generate an encrypted data element 310 based on the data element 308 and an encryption algorithm. The blockchain data element processing server 304 submits the encrypted data element 310 with a digital signature to the blockchain network 306.

After receiving the encrypted data element 310 and the digital signature, the blockchain network 306 can verify the digital signature to determine whether the encrypted data element 310 is sent by blockchain data element processing server 304. If a determination is made that the digital signature is valid, the blockchain network 306 can store the encrypted data element 310. If a determination is made that the digital signature is not valid, the blockchain network 306 can decline the encrypted data element 310.

In some embodiments, a client (e.g., client computing device 302b) can send a request to the blockchain network 306 for a data element 308. In response to the request, the blockchain network 306 can return an encrypted data element 310 to the client 302b. The encrypted data element 310 includes the requested data element 308 encrypted using an encryption algorithm. After receiving the encrypted data element 310, the client 302b sends a request to the blockchain data element processing server 304 to obtain the data element 308 in the encrypted data element 310. After receiving the request from the client 302b, the blockchain data element processing server 304 obtains the data element 308 from the encrypted data element 310 using a decryption algorithm. Then, the blockchain data element processing server 304 determines whether the data element 308 is a sensitive data element. If determining that the data element 308 is a sensitive data element, the blockchain data element processing server 304 can reject the request from the client 302b. If determining that send the data element 308 is not a sensitive data element, the blockchain data element processing server 304 can send the data element 308 to the client 302b.

Figure 4:
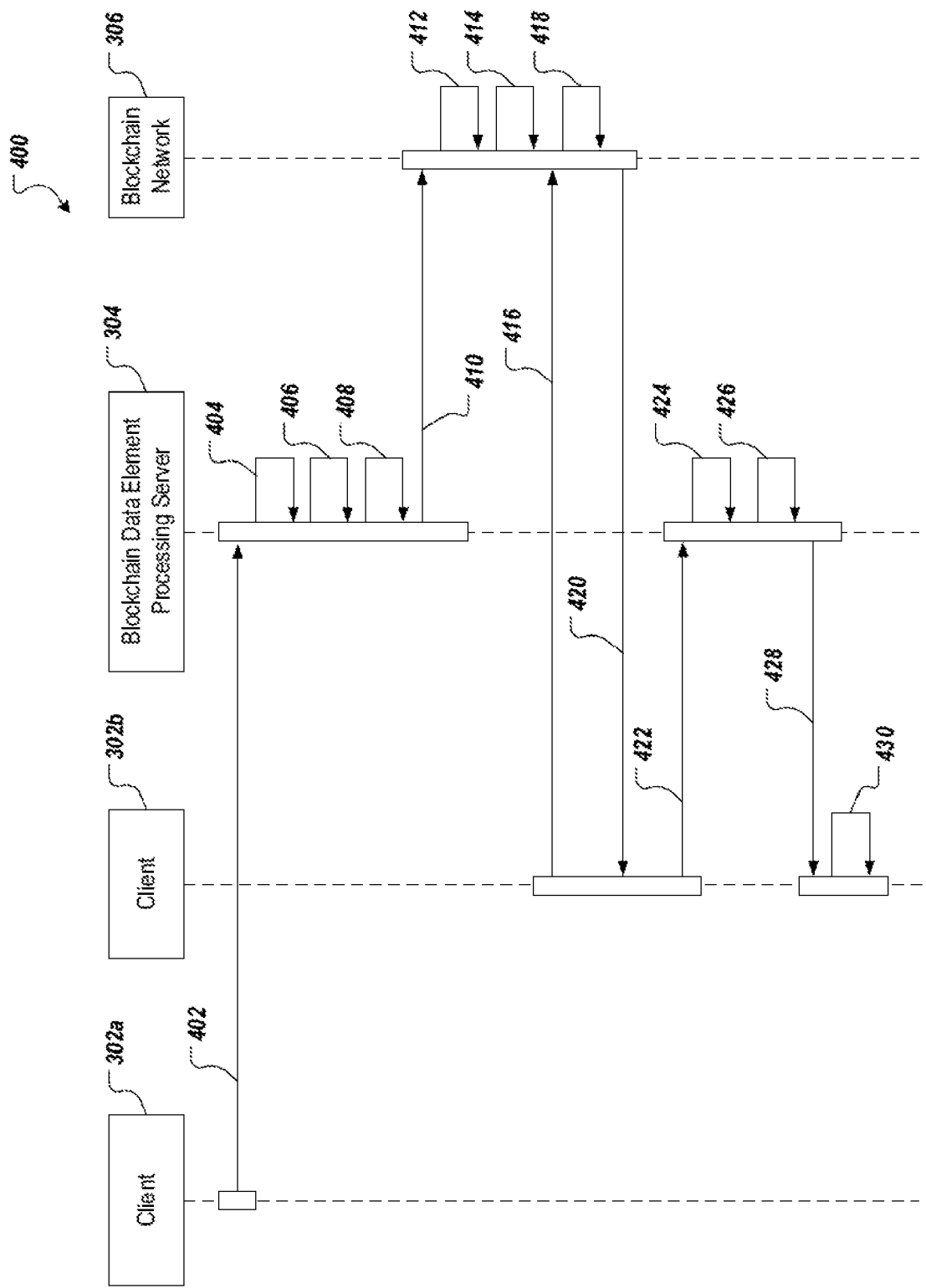
FIG. 4 depicts an example of a process that can be executed in accordance with embodiments of this specification.

FIG. 4 depicts an example of a signal flow 400 in accordance with embodiments of this specification. The signal flow 400 represents a process for managing data elements stored in a blockchain network. For convenience, the process will be described as being performed by a system of one or more computers, located in one or more locations, and programmed appropriately in accordance with this specification. For example, a distributed system (e.g., the environment 100 of FIG. 1; the system 300 of FIG. 3), appropriately programmed, can perform the process.

At 402, a client computing device 302a sends a request to blockchain data element processing server 304 to store a data element 308 into a blockchain network 306. The request can include an identity information (e.g. a device identifier) of the client computing device 302a. The data element 308 can have a format of text, audio, video, or image. In some embodiments, the data element 308 includes one or more keywords.

At 404, the blockchain data element processing server 304 determines whether the client computing device 302a is authorized to store the data element 308 into the blockchain network 306. In some embodiments, the blockchain data element processing server 304 can determine whether the client computing device 302a is authorized to store the data element 308 based on the identity information in the request. For example, the blockchain data element processing server 304 can store a whitelist of a number of device identifiers corresponding to a number of client computing devices that are authorized to stored data into the blockchain network 306. The blockchain data element processing server 304 can compare the device identifier of the client computing device 302a to the device identifiers in the whitelist. If identifying a match in the whitelist, the blockchain data element processing server 304 can determine that the client computing device 302 is authorized to store data into the blockchain network 306 and accept the request. If identifying no match in the whitelist, the blockchain data element processing server 304 can decline the request from the client computing device 302a.

In some embodiments, a client computing device 302 is pre-assigned a priority level. The priority level of a client computing device 302 can be determined based on historical data of the requests submitted by the client computing device 302, such as a number of times that the client computing device 302 have been declined a request to store data into the blockchain network 306. A request submitted by a client computing device 302 with a relatively higher priority level can be processed earlier by the blockchain data element processing server 304.

At 406, the blockchain data element processing server 304 determines whether the data element 308 is a sensitive data element. As noted, the sensitive data element can include data that are under surveillance or censorship by an authorization entity. In some embodiments, the blockchain data element processing server 304 stores a black library including a list of sensitive data elements that are periodically updated by the authorization entity. The blockchain data element processing server 304 can compare the data element 308 in the request with the sensitive data elements in the black library. If identifying a match, the blockchain data element processing server 304 determines that the data element 308 is a sensitive data element and rejects the request from the client computing device 302a. In some embodiments, the blockchain data element processing server 304 further sends a warning message to the client computing device 302a.

If identifying no match in the black library, the blockchain data element processing server 304 determines that the data element 308 is not a sensitive data element and accepts the request from client computing device 302a.

At 408, after accepting the request, the blockchain data element processing server 304 processes the data element 308 in the request and generate a blockchain data element (e.g., a blockchain transaction). In some embodiments, the blockchain data element includes an encrypted data element 310 and a first hash value of the data element 308. For example, the blockchain data element processing server 304 can generate the encrypted data element 310 based on the data element 308 and an encryption algorithm (e.g., Rivest-Shamir-Adleman (RSA)). In some embodiments, the first hash value of the data element 308 can be computed using a hash algorithm (e.g., secure hash algorithm (SHA)).

In some embodiments, the blockchain data element processing server 304 signs the blockchain data element using a private key of the blockchain data element processing server 304. For example, the blockchain data element processing server 304 can generate a digital signature based on the encrypted data element 310, the first hash value of the data element 308, and the private key of the blockchain data element processing server 304.

At 410, the blockchain data element processing server 304 submits the blockchain data element along with the digital signature to the blockchain network 306.

At 412, the blockchain network 306 verifies whether the digital signature from the blockchain data element processing server 304 is valid. In some embodiments, the blockchain network 306 stores a public key that is paired with the private key used to generate the digital signature, and can use the public key to verify the digital signature. In some embodiments, the blockchain network 306 can use a smart contract to perform the verification of the digital signature. For example, the blockchain network 306 can make a contract call to the smart contact and execute the smart contract using the public key and the digital signature.

At 414, after determining that the digital signature is valid, the blockchain network 306 stores the blockchain data element. For example, the blockchain network 306 can store the encrypted data element 310 and the first hash value of the data element 308 into network nodes of the blockchain network 306.

At 416, client computing device 302b sends a request to the blockchain network 306 for a data element 308 that is stored in the blockchain network 306. The request can include an identity information of the client computing device 302b.

At 418, the blockchain network 306 determines whether the client computing device 302b is authorized to obtain the data element 308 based on the identity information in the request, and if so, prepares a response to the request. In some embodiments, the response includes the encrypted data element 310 and the first hash value of the data element 308.

At 420, the blockchain network 306 sends the response to the client computing device 402 if determining that the client computing device 302b is authorized to obtain the data element 308. If determining that the client computing device 302b is not authorized to obtain the data element 308, the blockchain network 306 can reject the request from the client computing device 302b.

At 422, the client computing device 402b receives the response from the blockchain network 306 and sends a request to the blockchain data element processing server 304 for obtaining the data element 308 in the encrypted data element 310. In some embodiments, the request includes the encrypted data element 310 and an identity information of the client computing device 302b.

At 424, blockchain data element processing server 304 verifies whether the client computing device 302b is authorized to obtain the data element 308, and if so, obtains the data element 308 from the encrypted data element 310. In some embodiments, the blockchain data element processing server 304 obtains the data element 308 from the encrypted data element 310 using a decryption algorithm (e.g., RSA). If determining that the client computing device 302b is not authorized to obtain the data element 308, the blockchain data element processing server 304 can reject the request.

At 426, the blockchain data element processing server 304 determines whether the data element 308 is a sensitive data element. In some embodiments, the blockchain data element processing server 304 can compare the data element 308 with the sensitive data elements in the black library that is stored in the blockchain data element processing server 304. If a match is identified, the blockchain data element processing server 304 determines that the data element 308 is a sensitive data element and rejects the request from the client computing device 302b. If no match is identified, the blockchain data element processing server 304 determines that the data element 308 is not a sensitive data element.

At 428, the blockchain data element processing server 304 sends the data element 308 to the client computing device 302b if determining that the data element 308 is not a sensitive data element. In some embodiments, the blockchain data element processing server 304 can store frequently queried data elements 308 in a cache so that the decryption process can be reduced to expedite the processing of client requests.

At 430, the client computing device 302b verifies integrity of the data element 308 from the blockchain data element processing server 304. In some embodiments, the client computing device 302b computes a second hash value of the data element 308 received from the blockchain data element processing server 304, and compares the second hash value to the first hash value of the data element 308 that is previously received from the blockchain network 306 at step 420. If the second hash value of the data element 308 matches the first hash value of the data element 308, the client computing device 302b determines integrity of the data element 308 and that the data element 308 is fit for use. If the second hash value of the data element 308 does not matches the first hash value of the data element 308, the client computing device 302b determines that the data element 308 is potentially corrupted and is not fit for use.

Figure 5:
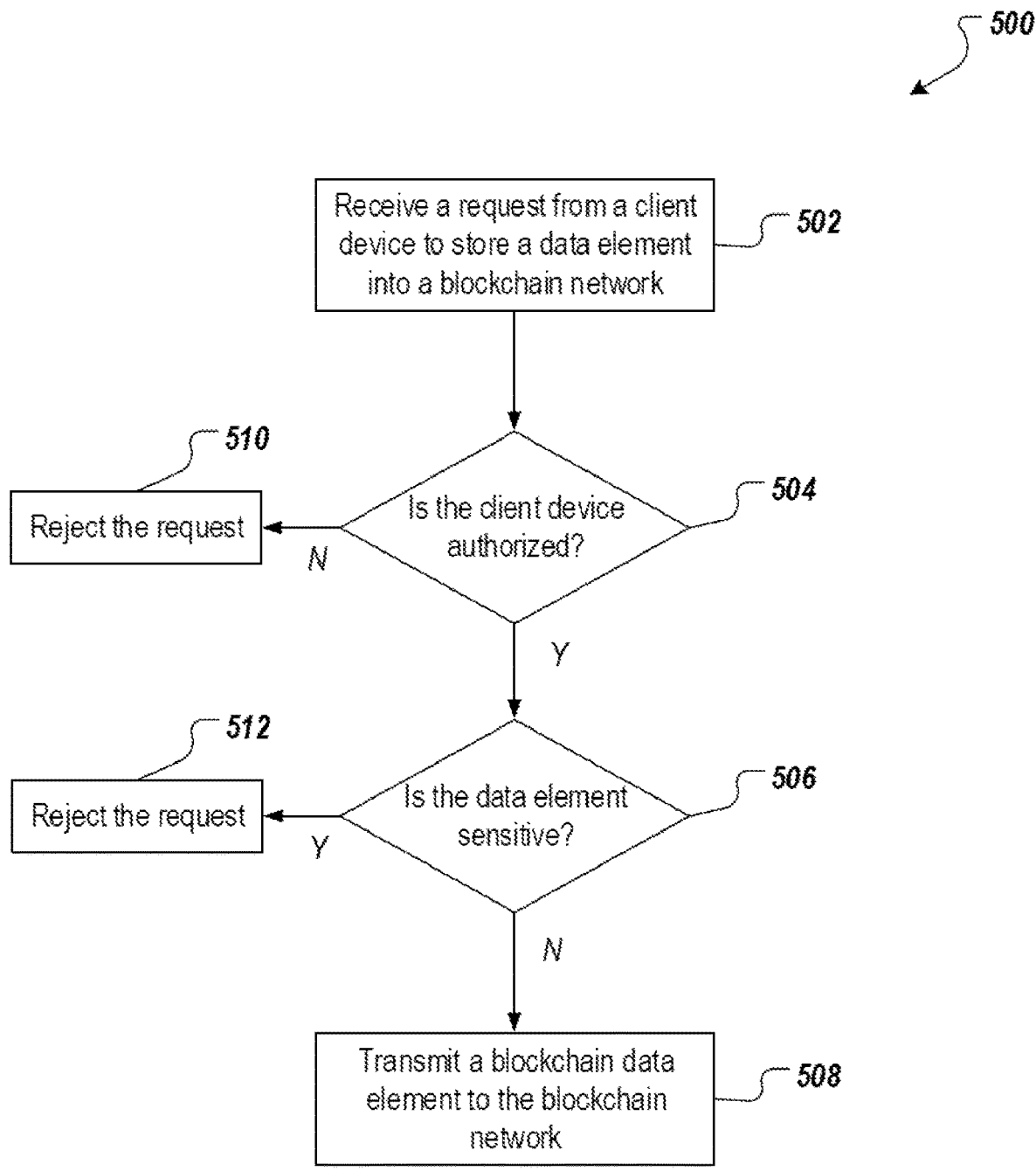
FIG. 5 depicts an example of a process that can be executed in accordance with embodiments of this specification.

FIG. 5 is a flowchart of an example of a process 500 for storing a data element into a blockchain network. For convenience, the process 500 will be described as being performed by a system of one or more computers, located in one or more locations, and programmed appropriately in accordance with this specification. For example, a distributed system, e.g., the distributed system 100 of FIG. 1 or the distributed system 300 of FIG. 3, appropriately programmed, can perform the process 500.

At 502, a blockchain data element processing server 304 receives a request from a client computing device 302 to store a data element 308 into a blockchain network 306. In some embodiments, the request can include an identity information (e.g. a device identifier) of the client computing device 302. In some embodiments, the data element 308 includes one or more keywords.

At 504, the blockchain data element processing server 304 determines whether the client computing device 302 is authorized to store the data element 308 into the blockchain network 306 based on the identity information in the request. In some embodiments, the blockchain data element processing server 304 can store a whitelist of a number of device identifiers corresponding to a number of client computing devices that are authorized to stored data into the blockchain network 306. The blockchain data element processing server 304 can compare the device identifier of the client computing device 302 to the device identifiers in the whitelist. If there is a match, the blockchain data element processing server 304 determines that the client computing device 302 is authorized to store the data element 308 into the blockchain network 306 and the process proceeds to step 506. If there is no match, the blockchain data element processing server 304 determines that the client computing device 302 is not authorized to store the data element 308 into the blockchain network 306 and the process proceeds to step 510 where the request is rejected.

At 506, in response to determining that client computing device 302 is authorized to store the data element 308 into the blockchain network 306, the blockchain data element processing server 304 determines whether the data element 308 is a sensitive data element. In some embodiments, the blockchain data element processing server 304 stores a black library and determines whether the data element 308 is a sensitive data element according to the black library. In some embodiments, the black library includes a list of sensitive data elements that are under surveillance or censorship and that are periodically updated by an authorization entity. The blockchain data element processing server 304 can compare the data element 308 in the request with the sensitive data elements in the black library. If there is a match, the blockchain data element processing server 304 determines that the data element 308 is a sensitive data element and the process proceeds to step 512 where the request is rejected. If there is no match, the blockchain data element processing server 304 determines that the data element 308 is not a sensitive data element and the process proceeds to step 508.

At 508, in response to determining that the data element 308 is not a sensitive data element, the blockchain data element processing server 304 transmits a blockchain data element generated based on the data element 308 and that is signed using a private key of the blockchain data element processing server 304 to the blockchain network 306. In some embodiments, the blockchain data element processes the data element 308 in the request and generate a blockchain data element (e.g., a blockchain transaction) that includes an encrypted data element 310 and a hash value of the data element 308. For example, the blockchain data element processing server 304 can generate the encrypted data element 310 based on the data element 308 and an encryption algorithm (e.g., RSA), and compute the first hash value of the data element 308 using a hash algorithm (e.g., SHA). In some embodiments, the blockchain data element processing server 304 signs the blockchain data element using a private key of the blockchain data element processing server 304. For example, the blockchain data element processing server 304 can generate a digital signature based on the blockchain data element and the private key of the blockchain data element processing server 30, and sends the digital signature along with the blockchain data element to the blockchain network 306. In some embodiments, the blockchain network 306 can verify the digital signature of the blockchain data element from the blockchain data element processing server 304, and in response to determining that the digital signature is valid, stores the blockchain data element.

Figure 6:
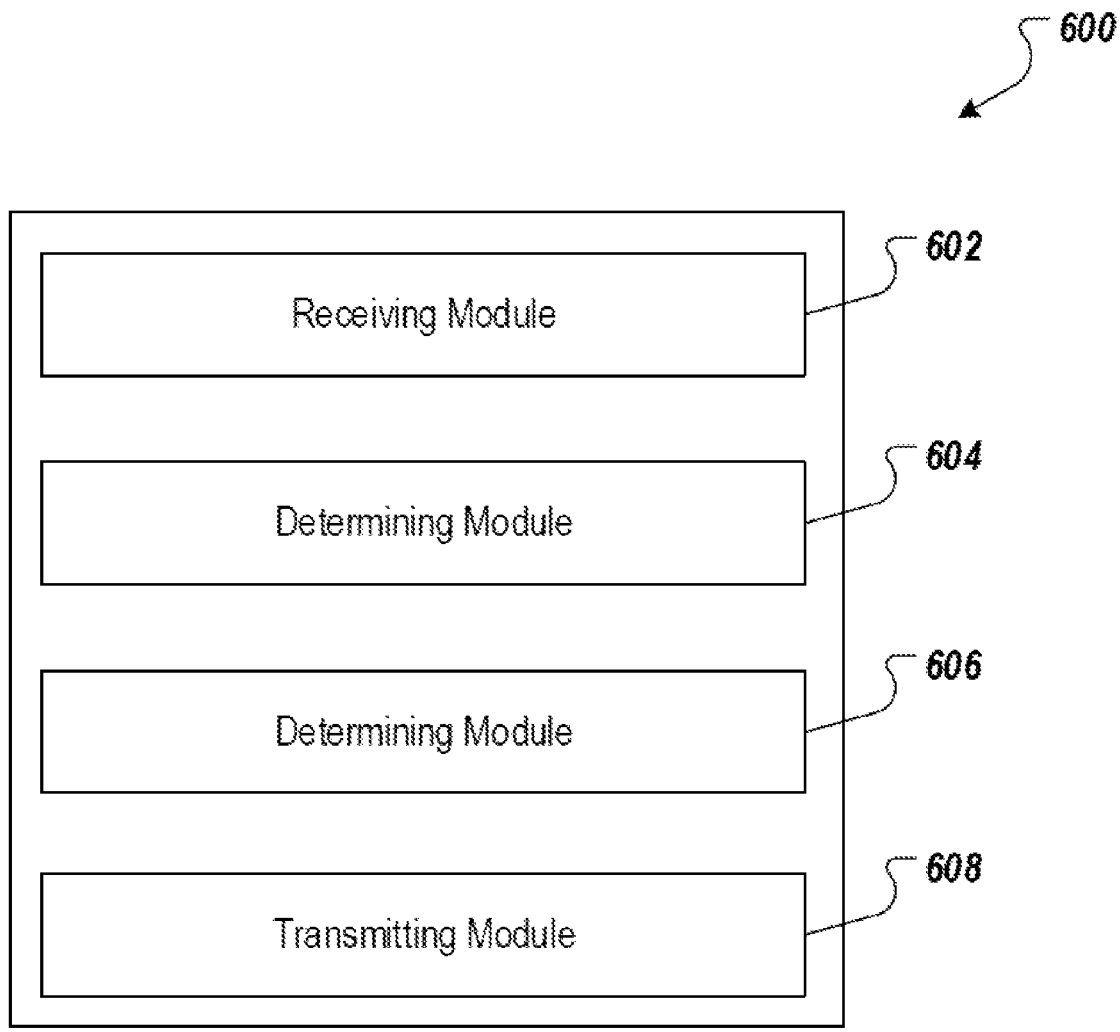
FIG. 6 depicts examples of modules of an apparatus in accordance with embodiments of this specification.

FIG. 6 is a diagram of an example of modules of an apparatus 600 in accordance with embodiments of this specification. The apparatus 600 can be an example of an embodiment of a blockchain data element processing sever configured to process data elements to be stored into a blockchain network. The apparatus 600 can correspond to the embodiments described above, and the apparatus 600 includes the following: a receiving module 602 that receives a request to store a data element into the blockchain network from a client computing device, the request including an identity information of the client computing device, the blockchain data element processing server storing a black library; a determining module 604 that determines whether the client computing device is authorized to store the data element into the blockchain network based on the identity information of the client computing device; a determining module 606 that determines whether the data element is a sensitive data element using the black library in response to determining that the client computing device is authorized to store the data element into the blockchain network; and a transmitting module 608 that transmits a blockchain data element generated based on the data element and that is signed using a private key of the blockchain data element processing server to the blockchain network.

In an optional embodiment, the apparatus 600 further includes the following: a declining sub-module for declining the request from the client computing device in response to determining that the client computing device is not authorized to store the data element into the blockchain network.

In an optional embodiment, the apparatus 600 further includes the following: a declining sub-module for declining the request from the client computing device in response to determining that the data element is a sensitive data element.

In an optional embodiment, the black library includes a number of sensitive data elements, and the determining whether the data element is a sensitive data element according to the black library includes performing a comparison between the data element and the plurality of sensitive data element in the black library.

In an optional embodiment, the number of sensitive data elements in the black library include one or more keywords under surveillance or censorship.

In an optional embodiment, the blockchain data element includes an encrypted data element and a hash value of the data element, and the encrypted data element include the data element that is encrypted using an encryption algorithm.

In an optional embodiment, the blockchain network verifies a digital signature of the blockchain data element from the blockchain data element processing server, and in response to determining that the digital signature is valid, stores the blockchain data element.

In an optional embodiment, the blockchain network receives a request for a data element stored in the blockchain network from the client computing device. The blockchain network determines whether the client computing device is authorized to obtain the data element. In response to determining that the client computing device is authorized to obtain the data element, the blockchain network sends a response to the client computing device, the response comprising an encrypted data element, the encrypted data element comprising the data element that is encrypted using an encryption algorithm.

In an optional embodiment, the blockchain network receives a request for a data element stored in the blockchain network from the client computing device. The blockchain network determines whether the client computing device is authorized to obtain the data element. The blockchain network rejects the request for the data element from the client computing device in response to determining that the client computing device is not authorized to obtain the data element In an optional embodiment, the apparatus 600 further includes the following: a receiving sub-module for receiving a request from the client computing device to obtain the data element in the encrypted data element; a first determining sub-module for determining whether the client computing device is authorized to obtain the data element; an obtaining sub-module for obtaining the data element from the encrypted data element using a decryption algorithm in response to determining that the client computing device is authorized to obtain the data element; a second determining sub-module for determining whether the data element is a sensitive data element; and a sending sub-module for sending the data element to the client computing device in response to determining that the data element is not a sensitive data element.

In an optional embodiment, the apparatus 600 further includes the following: a receiving sub-module for receiving a request from the client computing device to obtain the data element in the encrypted data element; a determining sub-module for determining whether the client computing device is authorized to obtain the data element; and a rejecting sub-module for rejecting the request from the client computing device to obtain the data element in the encrypted data element in response to determining that the client computing device is not authorized to obtain the data element.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIG. 6, it can be interpreted as illustrating an internal functional module and a structure of a blockchain data element processing apparatus. The blockchain data element processing apparatus can be an example of a blockchain data element processing server configured to process data elements to be stored into a blockchain network. An execution body in essence can be an electronic device, and the electronic device includes the following: one or more processors; and a memory configured to store an executable instruction of the one or more processors.

The techniques described in this specification produce one or more technical effects. For example, the methods described herein provide an improved control of data elements that are to be stored into a blockchain network. In some embodiments, when a client computing device submits a request to store data into or retrieve data from a blockchain network, an identity of the client computing device needs to be authenticated. In some embodiments, an authenticated client computing device can be allowed to store data into or retrieve data from the blockchain network, while a client computing device that fails the authentication will not be allowed to access the data in the blockchain network. This can prevent the data stored in the blockchain network from being compromised by malicious actors, thereby improving the data security of the blockchain network. Furthermore, in some embodiments, it is determined whether a data element to be stored into the blockchain network is a sensitive data element (e.g., privacy information or a malicious program that poses potential security threat). In some embodiments, data elements that are not determined as a sensitive data element can be allowed to store into the blockchain network, while data elements that are determined as a sensitive data element will be declined. This can further improve date security of the blockchain network. In some embodiments, the blockchain network verifies a digital signature that is received along with the data element, and stores the data element if the digital signature is valid. This facilitates verifying that the data element is sent by a trusted entity and that the data element is not altered during transmission, thereby improving data security. In some embodiments, the data elements stored in the blockchain network are encrypted using an encryption algorithm. This prevents the data elements from being easily obtained by a malicious actor who is not authorized to obtain the data elements. In some embodiments, a client computing device that obtains a data element from the blockchain network can verify integrity of the data element based on a hash value of the data element, thereby mitigating negative effects resulting from malicious alternation of the data element.

Described embodiments of the subject matter can include one or more features, alone or in combination. For example, in a first embodiment, a method for processing a data element to be stored into a blockchain network includes receiving, by a blockchain data element processing server, a request from a client computing device to store a data element into a blockchain network, the request including an identity information of the client computing device, the blockchain data element processing server storing a black library; determining, by the blockchain data element processing server, whether the client computing device is authorized to store the data element into the blockchain network based on the identity information of the client computing device; in response to determining that the client computing device is authorized to store the data element into the blockchain network, determining, by the blockchain data element processing server, whether the data element is a sensitive data element using the black library; and in response to determining that the data element is not a sensitive data element, transmitting, by the blockchain data element processing server, a blockchain data element generated based on the data element and that is signed using a private key of the blockchain data element processing server to the blockchain network. The foregoing and other described embodiments can each, optionally, include one or more of the following features:

A first feature, combinable with any of the following features, specifies that the method further includes: in response to determining that the client computing device is not authorized to store the data element into the blockchain network, declining, by the blockchain data element processing server, the request from the client computing device.

A second feature, combinable with any of the previous or following features, specifies that the method further includes: in response to determining that the data element is a sensitive data element, declining, by the blockchain data element processing server, the request from the client computing device.

A third feature, combinable with any of the previous or following features, specifies that the black library includes a plurality of sensitive data elements, and that the determining whether the data element is a sensitive data element according to the black library includes performing a comparison between the data element and the plurality of sensitive data element in the black library.

A fourth feature, combinable with any of the previous or following features, specifies that the plurality of sensitive data elements in the black library comprise one or more keywords under surveillance or censorship.

A fifth feature, combinable with any of the previous or following features, specifies that the blockchain data element comprises an encrypted data element and a hash value of the data element, the encrypted data element comprising the data element that is encrypted using an encryption algorithm.

A sixth feature, combinable with any of the previous or following features, specifies that the blockchain network verifies a digital signature of the blockchain data element from the blockchain data element processing server, and in response to determining that the digital signature is valid, stores the blockchain data element.

A seventh feature, combinable with any of the previous or following features, specifies that the method further includes the following: receiving, by the blockchain network and from the client computing device, a request for a data element stored in the blockchain network; determining, by the blockchain network, whether the client computing device is authorized to obtain the data element; and in response to determining that the client computing device is authorized to obtain the data element, sending, by the blockchain network, a response to the client computing device, the response comprising an encrypted data element, the encrypted data element comprising the data element that is encrypted using an encryption algorithm.

An eighth feature, combinable with any of the previous or following features, specifies that the method further includes the following: receiving, by the blockchain network and from the client computing device, a request for a data element stored in the blockchain network; determining, by the blockchain network, whether the client computing device is authorized to obtain the data element; and in response to determining that the client computing device is not authorized to obtain the data element, rejecting, by the blockchain network, the request for the data element from the client computing device A ninth feature, combinable with any of the previous or following features, specifies that the method further includes the following: receiving, by the blockchain data element processing server and from the client computing device, a request to obtain the data element in the encrypted data element; determining, by the blockchain data element processing server, whether the client computing device is authorized to obtain the data element; in response to determining that the client computing device is authorized to obtain the data element, obtaining, by the blockchain data element processing server, the data element from the encrypted data element using a decryption algorithm; determining, by the blockchain data element processing server, whether the data element is a sensitive data element; and in response to determining that the data element is not a sensitive data element, sending, by the blockchain data element processing server, the data element to the client computing device.

A tenth feature, combinable with any of the previous or following features, specifies that the method further includes the following: receiving, by the blockchain data element processing server and from the client computing device, a request to obtain the data element in the encrypted data element; determining, by the blockchain data element processing server, whether the client computing device is authorized to obtain the data element; and in response to determining that the client computing device is not authorized to obtain the data element, rejecting, by the blockchain data element processing server, request from the client computing device to obtain the data element in the encrypted data element.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a standalone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for blockchain network data element processing and storage, the computer-implemented method comprising:

receiving, by a blockchain data element processing server and from a client computing device, a request to store a data element into a blockchain network, the request comprising identity information of the client computing device, wherein the blockchain data element processing server stores a black library;

determining, by the blockchain data element processing server, whether the client computing device is authorized to store the data element in the blockchain network based on the identity information of the client computing device;

in response to determining that the client computing device is authorized to store the data element in the blockchain network, determining, by the blockchain data element processing server and using the black library, whether the data element is a sensitive data element;

in response to determining that the data element is not a sensitive data element, transmitting, by the blockchain data element processing server and to the blockchain network, a blockchain data element generated based on the data element and that is signed using a private key of the blockchain data element processing server, wherein the blockchain data element comprises an encrypted data element and a hash value of the data element, the encrypted data element comprising the data element that is encrypted using an encryption algorithm;

receiving, by the blockchain data element processing server and from the client computing device, a request to obtain the data element in the encrypted data element, wherein the request comprises the encrypted data element, and wherein the encrypted data element is retrieved by the client computing device from the blockchain network bypassing the blockchain data element processing server; and sending, by the blockchain data element processing server, the data element to the client computing device.

2. The method of claim 1, further comprising:
in response to determining that the client computing device is not authorized to store the data element in the blockchain network, declining, by the blockchain data element processing server, the request from the client computing device.

3. The method of claim 1, further comprising:
in response to determining that the data element is a sensitive data element, declining, by the blockchain data element processing server, the request from the client computing device.

4. The method of claim 1, wherein the black library comprises a plurality of sensitive data elements, and wherein determining whether the data element is a sensitive data element according to the black library comprises performing a comparison between the data element and the plurality of sensitive data elements in the black library.

5. The method of claim 4, wherein the plurality of sensitive data elements in the black library comprise one or more keywords under surveillance or censorship.

6. The method of claim 1, wherein the blockchain network verifies a digital signature of the blockchain data element from the blockchain data element processing server, and in response to determining that the digital signature is valid, stores the blockchain data element.

7. The method of claim 1, further comprising:
receiving, by the blockchain network and from the client computing device, a request for a data element stored in the blockchain network;
determining, by the blockchain network, whether the client computing device is authorized to obtain the data element; and
in response to determining that the client computing device is authorized to obtain the data element, sending, by the blockchain network, a response to the client computing device, the response comprising an encrypted data element, the encrypted data element comprising the data element that is encrypted using an encryption algorithm.

8. The method of claim 1, further comprising:
receiving, by the blockchain network and from the client computing device, a request for a data element stored in the blockchain network;
determining, by the blockchain network, whether the client computing device is authorized to obtain the data element; and
in response to determining that the client computing device is not authorized to obtain the data element, rejecting, by the blockchain network, the request for the data element from the client computing device.

9. The method of claim 1, further comprising:
determining, by the blockchain data element processing server, whether the client computing device is authorized to obtain the data element in the encrypted data element;
in response to determining that the client computing device is authorized to obtain the data element, obtaining, by the blockchain data element processing server, the data element from the encrypted data element using a decryption algorithm;
determining, by the blockchain data element processing server, whether the data element is a sensitive data element; and
in response to determining that the data element is not a sensitive data element, sending, by the blockchain data element processing server, the data element to the client computing device.

10. The method of claim 1, further comprising:
determining, by the blockchain data element processing server, whether the client computing device is authorized to obtain the data element in the encrypted data element; and
in response to determining that the client computing device is not authorized to obtain the data element, rejecting, by the blockchain data element processing server, the request from the client computing device to obtain the data element in the encrypted data element.

11. A non-transitory, computer-readable storage medium storing one or more instructions executable by a computer system to perform operations for blockchain network data element processing and storage, the operations comprising:
receiving, by a blockchain data element processing server and from a client computing device, a request to store a data element into a blockchain network, the request comprising identity information of the client computing device, wherein the blockchain data element processing server stores a black library;
determining, by the blockchain data element processing server, whether the client computing device is authorized to store the data element in the blockchain network based on the identity information of the client computing device;
in response to determining that the client computing device is authorized to store the data element in the blockchain network, determining, by the blockchain data element processing server and using the black library, whether the data element is a sensitive data element;
in response to determining that the data element is not a sensitive data element, transmitting, by the blockchain data element processing server and to the blockchain network, a blockchain data element generated based on the data element and that is signed using a private key of the blockchain data element processing server, wherein the blockchain data element comprises an encrypted data element and a hash value of the data element, the encrypted data element comprising the data element that is encrypted using an encryption algorithm;
receiving, by the blockchain data element processing server and from the client computing device, a request to obtain the data element in the encrypted data element, wherein the request comprises the encrypted data element, and wherein the encrypted data element is retrieved by the client computing device from the blockchain network bypassing the blockchain data element processing server; and sending, by the blockchain data element processing server, the data element to the client computing device.

12. The non-transitory, computer-readable storage medium of claim 11, the operations further comprising:

in response to determining that the client computing device is not authorized to store the data element in the blockchain network, declining, by the blockchain data element processing server, the request from the client computing device.

13. The non-transitory, computer-readable storage medium of claim 11, the operations further comprising:

in response to determining that the data element is a sensitive data element, declining, by the blockchain data element processing server, the request from the client computing device.

14. The non-transitory, computer-readable storage medium of claim 11, wherein the black library comprises a plurality of sensitive data elements, and wherein determining whether the data element is a sensitive data element according to the black library comprises performing a comparison between the data element and the plurality of sensitive data elements in the black library, wherein the plurality of sensitive data elements in the black library comprise one or more keywords under surveillance or censorship.

15. The non-transitory, computer-readable storage medium of claim 11, wherein the blockchain network verifies a digital signature of the blockchain data element from the blockchain data element processing server, and in response to determining that the digital signature is valid, stores the blockchain data element.

16. The non-transitory, computer-readable storage medium of claim 11, the operations further comprising:

receiving, by the blockchain network and from the client computing device, a request for a data element stored in the blockchain network;

determining, by the blockchain network, whether the client computing device is authorized to obtain the data element; and in response to determining that the client computing device is authorized to obtain the data element, sending, by the blockchain network, a response to the client computing device, the response comprising an encrypted data element, the encrypted data element comprising the data element that is encrypted using an encryption algorithm.

17. The non-transitory, computer-readable storage medium of claim 11, the operations further comprising:

receiving, by the blockchain network and from the client computing device, a request for a data element stored in the blockchain network;

determining, by the blockchain network, whether the client computing device is authorized to obtain the data element; and in response to determining that the client computing device is not authorized to obtain the data element, rejecting, by the blockchain network, the request for the data element from the client computing device.

18. The non-transitory, computer-readable storage medium of claim 11, the operations further comprising:

determining, by the blockchain data element processing server, whether the client computing device is authorized to obtain the data element in the encrypted data element;

in response to determining that the client computing device is authorized to obtain the data element, obtaining, by the blockchain data element processing server, the data element from the encrypted data element using a decryption algorithm;

determining, by the blockchain data element processing server, whether the data element is a sensitive data element; and in response to determining that the data element is not a sensitive data element, sending, by the blockchain data element processing server, the data element to the client computing device.

19. The non-transitory, computer-readable storage medium of claim 18, the operations further comprising:

determining, by the blockchain data element processing server, whether the client computing device is authorized to obtain the data element in the encrypted data element; and in response to determining that the client computing device is not authorized to obtain the data element, rejecting, by the blockchain data element processing server, the request from the client computing device to obtain the data element in the encrypted data element.

20. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations for blockchain network data element processing and storage, the operations comprising:

receiving, by a blockchain data element processing server and from a client computing device, a request to store a data element into a blockchain network, the request comprising identity information of the client computing device, wherein the blockchain data element processing server stores a black library;

determining, by the blockchain data element processing server, whether the client computing device is authorized to store the data element in the blockchain network based on the identity information of the client computing device;

in response to determining that the client computing device is authorized to store the data element in the blockchain network, determining, by the blockchain data element processing server and using the black library, whether the data element is a sensitive data element;

in response to determining that the data element is not a sensitive data element, transmitting, by the blockchain data element processing server and to the blockchain network, a blockchain data element generated based on the data element and that is signed using a private key of the blockchain data element processing server, wherein the blockchain data element comprises an encrypted data element and a hash value of the data element, the encrypted data element comprising the data element that is encrypted using an encryption algorithm;

receiving, by the blockchain data element processing server and from the client computing device, a request to obtain the data element in the encrypted data element, wherein the request comprises the encrypted data element, and wherein the encrypted data element is retrieved by the client computing device from the blockchain network bypassing the blockchain data element processing server; and sending, by the blockchain data element processing server, the data element to the client computing device.

21. The system of claim 20, the operations further comprising:

in response to determining that the client computing device is not authorized to store the data element in the blockchain network, declining, by the blockchain data element processing server, the request from the client computing device.

22. The system of claim 20, the operations further comprising:

in response to determining that the data element is a sensitive data element, declining, by the blockchain data element processing server, the request from the client computing device.

23. The system of claim 20, wherein the black library comprises a plurality of sensitive data elements, and wherein determining whether the data element is a sensitive data element according to the black library comprises performing a comparison between the data element and the plurality of sensitive data elements in the black library, wherein the plurality of sensitive data elements in the black library comprise one or more keywords under surveillance or censorship.

24. The system of claim 20, the operations further comprising:

receiving, by the blockchain network and from the client computing device, a request for a data element stored in the blockchain network;

determining, by the blockchain network, whether the client computing device is authorized to obtain the data element; and in response to determining that the client computing device is authorized to obtain the data element, sending, by the blockchain network, a response to the client computing device, the response comprising an encrypted data element, the encrypted data element comprising the data element that is encrypted using an encryption algorithm.

25. The system of claim 20, the operations further comprising:

receiving, by the blockchain network and from the client computing device, a request for a data element stored in the blockchain network;

determining, by the blockchain network, whether the client computing device is authorized to obtain the data element; and in response to determining that the client computing device is not authorized to obtain the data element, rejecting, by the blockchain network, the request for the data element from the client computing device.

26. The system of claim 20, the operations further comprising:

determining, by the blockchain data element processing server, whether the client computing device is authorized to obtain the data element in the encrypted data element;

in response to determining that the client computing device is authorized to obtain the data element, obtaining, by the blockchain data element processing server, the data element from the encrypted data element using a decryption algorithm;

determining, by the blockchain data element processing server, whether the data element is a sensitive data element; and in response to determining that the data element is not a sensitive data element, sending, by the blockchain data element processing server, the data element to the client computing device.

27. The system of claim 20, the operations further comprising:

determining, by the blockchain data element processing server, whether the client computing device is authorized to obtain the data element in the encrypted data element; and in response to determining that the client computing device is not authorized to obtain the data element, rejecting, by the blockchain data element processing server, the request from the client computing device to obtain the data element in the encrypted data element.

* * * * *

UNITED STATES PATENT AND TRADEMARK OFFICE
CERTIFICATE OF CORRECTION

PATENT NO. : 10,917,249 B2
APPLICATION NO. : 16/945296
DATED : February 9, 2021
INVENTOR(S) : Zhiyuan Feng, Yanpeng Li and Long Cheng Page 1 of 1

It is certified that error appears in the above-identified patent and that said Letters Patent is hereby corrected as shown below:

In the Specification

Column 1, Line 9, Delete "10,778.445," and insert -- 10,778,445, --, therefor.

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*